(12) United States Patent
Pickard et al.

(10) Patent No.: US 12,461,902 B1
(45) Date of Patent: Nov. 4, 2025

(54) METHOD AND SYSTEM FOR DATA STORAGE AND RETRIEVAL

(71) Applicant: Trayport Limited, London (GB)

(72) Inventors: Elliott Pickard, London (GB); Stephen Marcantonio, London (GB); Michael Alexander Cowley, London (GB)

( * ) Notice: Subject to any disclaimer, the term of this patent is extended or adjusted under 35 U.S.C. 154(b) by 0 days.

(21) Appl. No.: 19/045,642

(22) Filed: Feb. 5, 2025

(51) Int. Cl.
*G06F 16/21* (2019.01)
*G06F 16/2455* (2019.01)

(52) U.S. Cl.
CPC ........ *G06F 16/219* (2019.01); *G06F 16/2455* (2019.01)

(58) Field of Classification Search
CPC .......................... G06F 16/219; G06F 16/2455
USPC ................................................. 707/654, 695
See application file for complete search history.

(56) References Cited

U.S. PATENT DOCUMENTS

| | | | | |
|---|---|---|---|---|
| 6,904,526 B1* | 6/2005 | Hongwei | ................ | G06F 21/31 713/172 |
| 7,873,046 B1* | 1/2011 | Seshadri | ................ | H04L 63/14 370/401 |
| 8,135,633 B1* | 3/2012 | LeBaron | ................ | G06Q 40/12 705/30 |
| 8,166,003 B2* | 4/2012 | Friesenhahn | ........... | G06F 16/93 707/695 |
| 8,639,625 B1* | 1/2014 | Ginter | ..................... | G06F 21/78 705/50 |
| 8,849,858 B2* | 9/2014 | Lim | ..................... | G06F 11/3438 707/785 |
| 9,075,843 B2* | 7/2015 | Gimbel | ............. | G06F 16/24547 |
| 9,361,337 B1* | 6/2016 | Bhave | ................... | H04L 69/329 |
| 9,396,287 B1* | 7/2016 | Bhave | ................... | G06F 16/334 |
| 9,590,967 B2* | 3/2017 | Rich | ...................... | H04L 63/08 |
| 10,924,347 B1* | 2/2021 | Narsian | ................... | H04L 67/10 |
| 10,936,573 B2* | 3/2021 | Ducott, III | .......... | G06F 21/6218 |
| 11,308,490 B2* | 4/2022 | Little | ..................... | G06Q 20/40 |
| 11,630,822 B2* | 4/2023 | Helms | .................. | G06F 21/602 707/769 |
| 11,698,901 B1* | 7/2023 | Porath | .................. | G06F 16/248 707/725 |
| 11,954,216 B1* | 4/2024 | Markle | ............... | G06F 21/6218 |
| 12,124,687 B1* | 10/2024 | Porath | ................ | G06F 16/2477 |

(Continued)

*Primary Examiner* — Hanh B Thai
(74) *Attorney, Agent, or Firm* — RC Trademark Company (57) ABSTRACT

Disclosed is a method for data storage and retrieval. The method comprising receiving data entries for events, wherein each event amongst events comprises versions having different values of data entries stored therein; generating and storing encoded value for each version of each event indicative of access permissions exclusive for user(s) amongst users for each version of each event; recording deviations, in each data entry; creating and storing dataset of recorded deviations for each data entry; receiving user query for data retrieval, wherein user query comprises parameter(s) identifying event(s) amongst events associated with user query; determining version amongst versions of event(s) indicative of access permissions for user; identifying data entry(s) data entries that is corresponding to determined version of event(s); retrieving recorded deviation in data entry(s), based on stored dataset of recorded deviations for data entry(s); and providing response to user, based on data entry(s) and recorded deviation in data entry(s).

10 Claims, 3 Drawing Sheets

(56) References Cited

U.S. PATENT DOCUMENTS

| | | | |
|---|---|---|---|
| 2005/0027999 A1* | 2/2005 | Pelly | G06F 21/34 713/194 |
| 2005/0097441 A1* | 5/2005 | Herbach | G06F 21/10 715/229 |
| 2013/0282952 A1* | 10/2013 | Miyamae | G06F 12/0884 711/120 |
| 2014/0047040 A1* | 2/2014 | Patiejunas | G06F 16/1734 709/219 |
| 2015/0348000 A1* | 12/2015 | Khan | G06Q 20/385 705/41 |
| 2017/0177877 A1* | 6/2017 | Suarez | G06F 21/6218 |
| 2017/0242893 A1* | 8/2017 | Kephart | G06Q 10/0631 |
| 2017/0242894 A1* | 8/2017 | Kephart | G06F 16/2455 |
| 2017/0344564 A1* | 11/2017 | Aldea Lopez | G06F 11/1441 |
| 2018/0032861 A1* | 2/2018 | Oliner | G06Q 10/0637 |
| 2018/0109358 A1* | 4/2018 | Xing | H04W 28/04 |
| 2018/0316579 A1* | 11/2018 | Bhave | G06F 16/3337 |
| 2019/0043130 A1* | 2/2019 | Fishman | G06Q 40/06 |
| 2019/0207969 A1* | 7/2019 | Brown | G06F 21/552 |
| 2020/0019720 A1* | 1/2020 | Chasman | H04L 67/34 |
| 2020/0320417 A1* | 10/2020 | Corning | G06F 21/85 |
| 2020/0327252 A1* | 10/2020 | Mcfall | G06F 21/78 |
| 2021/0004332 A1* | 1/2021 | Geri | G06F 12/0815 |
| 2021/0073284 A1* | 3/2021 | Hunter | H04L 9/3239 |
| 2021/0073285 A1* | 3/2021 | Hunter | H04L 9/3263 |
| 2021/0073287 A1* | 3/2021 | Hunter | H04L 67/133 |
| 2021/0073291 A1* | 3/2021 | Hunter | G06F 16/1858 |
| 2021/0092141 A1* | 3/2021 | Gamble | H04L 63/1433 |
| 2021/0157312 A1* | 5/2021 | Cella | G01M 13/045 |
| 2021/0174257 A1* | 6/2021 | Pothula | G06F 16/289 |
| 2021/0209077 A1* | 7/2021 | Snellman | G06F 9/541 |
| 2021/0392142 A1* | 12/2021 | Stephens | H04L 63/104 |
| 2022/0101180 A1* | 3/2022 | Bhide | G06V 10/757 |
| 2022/0222047 A1* | 7/2022 | Todirel | G06F 9/453 |
| 2022/0286446 A1* | 9/2022 | Hecht | H04L 63/0846 |
| 2022/0293107 A1* | 9/2022 | Leaman | G06N 20/00 |
| 2022/0343250 A1* | 10/2022 | Tremblay | G06F 3/0482 |
| 2023/0195429 A1* | 6/2023 | Hunter | G06F 8/65 707/798 |
| 2023/0259632 A1* | 8/2023 | Marciano | G06F 21/554 726/25 |
| 2023/0315403 A1* | 10/2023 | Liu | G06F 8/71 713/193 |
| 2023/0316186 A1* | 10/2023 | Miller | G06F 40/40 705/7.25 |
| 2023/0325816 A1* | 10/2023 | Cella | G06Q 40/04 |
| 2023/0359905 A1* | 11/2023 | Jagasia | G06N 3/098 |
| 2023/0385042 A1* | 11/2023 | Obando Chacon | G06F 8/443 |
| 2023/0401332 A1* | 12/2023 | Vahidnia | H04L 63/101 |
| 2023/0410093 A1* | 12/2023 | Cella | G06Q 40/04 |
| 2023/0418793 A1* | 12/2023 | Urdiales | G06F 16/215 |
| 2024/0056486 A1* | 2/2024 | Lowenhardt | H04L 41/16 |
| 2024/0121242 A1* | 4/2024 | Miyake | H04L 63/102 |
| 2024/0195610 A1* | 6/2024 | Lee | G06F 21/6227 |
| 2024/0291863 A1* | 8/2024 | Cohen | G06F 21/53 |
| 2025/0028310 A1* | 1/2025 | Turcan | G01M 1/22 |
| 2025/0106399 A1* | 3/2025 | Zhou | H04N 19/132 |

\* cited by examiner

METHOD AND SYSTEM FOR DATA STORAGE AND RETRIEVAL

TECHNICAL FIELD

The present disclosure relates to methods for data storage and retrieval. Moreover, the present disclosure relates to systems for data storage and retrieval.

BACKGROUND

In recent times, handling financial data from numerous trading companies, each with distinct perspectives on market tradability and visibility has become challenging and cumbersome. The dual origin of such financial data from both traders and trade exchanges adds complexity to the optimization of storage and retrieval processes of such financial data. There exist the technical shortcoming of storing and retrieving financial data in a visibility mapping performed in a way that is both storage-space efficient and retrieval-time efficient when queried, i.e. queries data fast and with a minimal amount of storage. In financial data management, addressing substantial computational loads from vast datasets, managing dynamic user-specific visibility and permissions, and achieving efficient storage optimization are key challenges.

Moreover, contemporary financial data management systems lack effective recording mechanisms of user data during ingestion to capture real-time perspectives where permission at ingestion time must be preserved. The contemporary financial data management systems lack efficient mechanisms for data exchange while maintaining consistency in exchange data, where permissions at ingestion time are applied.

Therefore, in light of the foregoing discussion, there exists a need to overcome the aforementioned drawbacks.

SUMMARY

The aim of the present disclosure is to provide a method and system to improve speed and efficiency of data storage and retrieval. The aim of the present disclosure is achieved by providing a method and a system for data storage and retrieval as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a method for data storage and retrieval, the method comprising:

receiving a plurality of data entries for a corresponding plurality of events from a computing application, wherein each event amongst the corresponding plurality of events comprises a plurality of versions having different values of the plurality of data entries stored therein;

generating an encoded value for each version of each event, wherein the generated encoded value is indicative of access permissions exclusive for at least one user amongst a plurality of users for each version of each event;

storing the generated encoded value for each version of each event;

recording deviations, in each data entry, based on at least one action associated with the plurality of the events;

creating a dataset of the recorded deviations;

storing the dataset of the recorded deviations for each data entry;

receiving a user query for data retrieval from a user amongst the plurality of users, wherein the user query comprises at least one parameter for identifying at least one event amongst the plurality of events associated with the user query;

determining a version amongst the plurality of versions of the at least one event indicative of access permissions for the user, based on the stored encoded value for the plurality of versions of the at least one event;

identifying at least one data entry amongst the plurality of data entries that is corresponding to the determined version of the at least one event identified from the user query;

retrieving the recorded deviation in the at least data entry at intervals of a time duration indicated in the at least one parameter in the user query, based on the stored dataset of the recorded deviations for the at least one data entry; and providing a response to the user, wherein the response is determined based on the at least one data entry and the retrieved recorded deviation in the at least one data entry at the intervals of the time duration.

The present disclosure provides an aforementioned method for efficient management of the data by providing security enhancement with strict access control, data storage optimization, and the data retrieval, with a focus on providing fast and efficient access to a comprehensive order book information while ensuring dynamic visibility and permissions based on user-specific attributes. The method includes a step of encoding the data based on access permissions granted to the user for a specific event (for example, a specific financial trade or transaction), thereby ensuring security of sensitive data. Moreover, the method provides fast retrieval of the data at a later time when a query is received from a user, by incorporating a step for storing the recorded deviations and changes in the data according to a corresponding timestamp. Furthermore, the method reduces a need for hardware elements and resources such as storage capacity, storage bandwidth, network bandwidth and processing time which makes the system cost-efficient.

In a second aspect, the present disclosure provides a system for data storage and retrieval, the system comprising a processor configured to:
  receive a plurality of data entries for a corresponding plurality of events from a computing application, wherein each event amongst the corresponding plurality of events comprises a plurality of versions having different values of the plurality of data entries stored therein;
  generate an encoded value for each version of each event, wherein the generated encoded value is indicative of access permissions exclusive for at least one user amongst a plurality of users for each version of each event;
  store the generated encoded value for each version of each event;
  record deviations, in each data entry, based on at least one action associated with the plurality of the events;
  create a dataset of the recorded deviations;
  store the dataset of the recorded deviations for each data entry;
  receive a user query for data retrieval from a user amongst the plurality of users, wherein the user query comprises at least one parameter to identify at least one event amongst the plurality of events associated with the user query;
  determine a version amongst the plurality of versions of the at least one event indicative of access permissions for the user, based on the stored encoded value for the plurality of versions of the at least one event;
  identify at least one data entry amongst the plurality of data entries that is corresponding to the determined version of the at least one event identified from the user query;
  retrieve the recorded deviation in the at least data entry at intervals of a time duration indicated in the at least one parameter in the user query, based on the stored dataset of the recorded deviations for the at least one data entry; and
  provide a response to the user, wherein the response is determined based on the at least one data entry and the retrieved recorded deviation in the at least one data entry at the intervals of the time duration.

The present disclosure provides an aforementioned system to generate the encoded value for each event indicating user-specific access permissions to ensure data protection. Moreover, by continuously recording deviations or changes in the data over a time interval and creating the aggregated dataset of the recorded deviations in the data to provide optimized data storage facility, as well as improved retrieval of the stored data, and thereby enables the user to query historical data more effectively. The system provides faster data retrieval speed, facilitates user-specific queries, and ensures compliance with dynamic access control, ultimately improving decision-making processes in financial data management. Additionally, the system provides an efficient time and resource effective data management while minimizing the environmental impact associated with excessive computational and storage demands. Furthermore, the system reduces a need for hardware elements and resources such as storage capacity, storage bandwidth, network bandwidth and processing time which makes the system cost-efficient.

Throughout the description, the term "plurality of events" refers to activities or actions related to the placement, modification, removal or execution of a financial trade or financial order performed on the computing application. For example, the event may pertain to one of: an initiation of the financial trade for buying or selling of an asset or a financial instrument, modification of a quantity or a price of the asset or the financial instrument in the financial trade, cancellation of the financial trade, execution of the financial trade, rejection of the initiated financial trade; updating a status for the financial trade. Optionally, the plurality of events comprises order events and/or trade events.

Notably, the financial order is placed on one or more contracts, with an aggregated price level or another appropriate entity that results in the finalization of one or more financial trades being matched with another financial order, manually or automatically. Moreover, the financial trade includes an agreement between the users to exchange a combination of money or commodities either immediately or at a future instant in time. It will be appreciated that the financial trade is a result of matching of two or more financial orders. Optionally, the financial trade is executed either electronically or by means of a user's voice.

Throughout the present disclosure, the term "computing application" refers to a software program or set of programs designed to perform specific tasks or functions on a computing device (for example, a computer, laptop, smartwatch, and the like). In context of the present disclosure, the computing application is configured to act as an interface for the users to execute the plurality of events. Notably, the computing application is associated with a venue. Herein, the term "venue" refers to an established marketplace where the users are able to place the financial orders publicly or privately, view and interact with the financial orders under a known or anonymous identity, and execute the financial trades. Examples of venues include Exchanges, Inter-Dealer Brokerages, and the like. Throughout the present disclosure, the term "plurality of data entries" refers to those entries of data which are indicative of information pertaining to the plurality of events. It will be appreciated that for each event amongst the plurality of events, there is a corresponding data entry from amongst the corresponding plurality of data entries. In this regard, the plurality of data entries includes raw financial data associated with the corresponding plurality of events. Optionally, the plurality of data entries comprises data in form of integers, strings, floating point values, or any other serializable data type. The plurality of data entries include attributes of plurality of events; dynamics of plurality of events depicting information related to changes in a bid, an ask-price, and quantities in the financial trade, data pertaining to price movements or halts in the financial trade, data pertaining to individual financial trade executions, including price, volume, and timestamps, and the like. The attributes of the plurality of events comprise at least one of: event identifiers (such as an order number, an order type, an order quantity, an order status, an order duration and the like) of the plurality of events, timestamps associated with the plurality of events, information on execution venue of the plurality of events. For example, the plurality of data entries comprises attributes such as price, validity, period of validity, underlying commodity, asset type of the plurality of events, and the like.

Throughout the present disclosure, the term "version" refers to a certain view of a given event from amongst the plurality of events having certain values of the plurality of data entries stored therein. Notably, each event comprising the plurality of versions implies that each event comprises multiple versions in which the values of the plurality of data entries in any version from amongst the plurality of versions is different from the values of the plurality of data entries in remaining versions from amongst the plurality of versions. For example, a given data entry of a price of a given event has a different value in each different version of the given event. In another example, a given version of a given event associated with an organization of a given user has values for a plurality of data entries for the given event that are different from values for the plurality of data entries for the given event in other versions of the given event not associated with the organization of the given user.

Optionally, the step of receiving the plurality of data entries from the computing application further comprises:
  receiving data entries from a plurality of input streams, and
  merging the data entries received from the plurality of input streams for generating the plurality of data entries.

In this regard, the data entries are received from the plurality of input streams via a communication interface (for example, a Wi-Fi interface, a bluetooth interface, and the like). The term "plurality of input streams" refers to sources or channels gathering and tracking the raw financial data. For example, the plurality of input streams may refer to: sensors in high-frequency trading (HFT), local and cloud based data repositories storing the historical data of plurality of trades and other structured data, external systems including external trading platforms, financial data vendors, or application program interface (API) integrations with third-party services. Notably, merging the data entries received from the plurality of input streams relates to the compilation of the data entries received from the plurality of input streams into a single source of data which are the plurality of data entries. A beneficial effect of the above features is that the data entries from different input streams are taken into account in the plurality of data entries.

Notably, the plurality of data entries are stored for efficient data retrieval when required. The plurality of data entries are stored in a way that enables the plurality of data entries to be reconstructed accurately during data retrieval according to the access permissions of the user from whom the user query is received. The storage of the plurality of data entries allows for data minimization; for example: the amount of data that needs to be read, the amount of data that needs to be transmitted, the amount of processing required for the data, the time taken to transmit all the data entries relevant to the user query, the time taken to transmit earliest of the data entries relevant to the user query, and the like. Notably, the data entries for each event ranges from fewer than 100 per day to thousands per second. Thus, the storage of the plurality of data entries is designed to handle the extremes of both scenarios.

Optionally, the plurality of data entries are stored in the form of strips, where the strips are used to represent different periods of time. The decision of when to modify a strip id is based on heuristics with the objective of minimizing the amount of data read during the data retrieval, as well as minimizing the number of separate strips required. The heuristics include an amount of data present in each strip. Notably, each strip comprises a starting value $S_{start}$ and a final value $S_{end}$. Optionally, the strips are in an open source binary format. Moreover, splitting the plurality of data entries in the strips for storage removes the need to read and discard the data entries of those events which are not relevant to the user query. Furthermore, when the deviations in the plurality of data entries are being recorded, the deviations are split into either a delete category or upsert category. The recorded deviations under the delete category are added to a previous strip and the recorded deviations under the upsert category are added to a new strip.

Optionally, the data entries received from the plurality of input streams are synchronized and merged using one of: sorting, filtering, pattern recognition algorithms. In this regard, as the data entries received from the plurality of input streams may be unorganized and/or unstructured, the processor is configured to synchronize, structure and merge the received data entries utilizing one of: sorting, filtering, pattern recognition algorithms. The sorting of the data entries is performed by utilizing one of the sorting algorithms such as a bubble sort, selection sort, insertion sort, merge sort, quicksort, and heap sort, depending on factors such as a size of the data entries, the timestamp of the data entries, the source input stream, and the distribution of data entries. The sorting of data entries enables efficient synchronizing, merging, storing and encoding of the data entries. The filtering of the data entries is performed by utilizing filtering algorithms, pre-sorting and post-sorting to remove erroneous entries, missing entries, and to extract relevant information based on specific criteria, for example: thresholding financial assets based on monetary value, or based on growth and low debt-to-equity ratio and any such criteria, and to identify outliers or anomalies. The pattern recognition is applied to the data entries using one of the pattern recognition algorithms, such as regression analysis, time series analysis, machine learning algorithms (e.g., decision trees, support vector machines, neural networks), and/or clustering algorithms in order to analyze the received data entries and recognizing patterns of the data entries. The aforementioned sorting, filtering and pattern recognition algorithms of the data entries are utilized to merge the received data entries. The resultant technical effect is that the data entries received from the plurality of input streams are effectively merged and deduplicated for compiling the plurality of data entries.

Throughout the present disclosure, the term "user" refers to a person or entity (e.g., an organization or a company) that executes or views a given event. Optionally, the plurality of users may be in the form of at least one of: traders, brokers, viewers (i.e., the users who have the access permissions to only view the plurality of data entries for the corresponding plurality of events).

Throughout the present disclosure, the term "encoded value" refers to a value in encoded form generated for each version of each event, that indicates which of the one or more users (i.e., at least one user) from amongst the plurality of users have the access permissions for that version of that event. Notably, the access permissions being exclusive for the at least one user amongst the plurality of users for each version of each event implies that the at least one user amongst the plurality of users that have the access permissions for that version of that event cannot have the access permissions for another version of that event. In other words, the encoded value is a serial data structure capable of storing a set of unique non-negative integers (where each non-negative integer represents an access permission) efficiently in terms of memory usage and processing time while encoding and decoding, such that the presence of a given non-integer in the set is quickly determined. For example, the encoded value is in the form of bitmask value where each bit represents a non-negative integer in ascending order, and the value of each bit indicates whether that non-negative integer is present in the set. Notably, the encoded value contains values for each non-negative integer stored as inverse Boolean values when a separate Boolean value for the encoded value is set to 1. For example, in an encoded value, all the non-negative integers amongst the set of non-negative integers are interpreted as inverted when a separate Boolean value for the for the encoded value is set to 1. Optionally, when the user is a company with a group of individuals, then the encoded value for each individual within the company is identical, indicating the same access permissions for each individual. Throughout the present disclosure, the term "access permissions" refers to permissions that indicate what actions said user can perform with respect to that version of that event. For example, said user may not see said version of said event related to a given venue due to not having the appropriate relationship with the venue. In another example, the said user may see a subset of data entries in said version of the event related to the given venue, based on the exclusive access permissions for said user.

Optionally, the access permissions comprise a read permission to view the said version of said event. In this regard, the read permission enables said user to only be able to read the contents of the data entry corresponding to said event. A resultant technical effect is that the access permissions effectively allow the user to view historical data, as well as real-time data corresponding to said event.

Optionally, the encoded value for each version of each event comprises a plurality of bits, and wherein each bit amongst the plurality of bits represents the access permissions for each user amongst the at least one user associated with said version of said event. In this regard, at least one encoding technique is utilized for generating the encoded value. The at least one encoding technique is selected from at least one of: binary encoding, one-hot encoding, integer encoding, run length encoding (RLE), base64 encoding, delta encoding, and the like. Throughout the present disclosure, the term "plurality of bits" refers to binary digits that are used to encode the information that is to be represented by the encoded value. Notably, the number of the plurality of bits in the encoded value is dependent on the number of the at least one user having access permissions for said version of the event. For example, if the number of at least one user having access permissions for said version of said event is 4, then the number of the plurality of bits is 4, wherein each of the 4 bits represents the access permissions for given users amongst the 4 users having access permissions for said version of the event. This results in the beneficial effect that the access permissions are effectively encoded in the encoded value via the plurality of bits.

Optionally, a value assigned to each bit amongst the plurality of bits is:
zero indicating the corresponding permission represented by said bit is denied; or
one indicating the corresponding permission represented by said bit is granted.

In this regard, each bit amongst the plurality of bits is assigned a value of zero or one to represent access permissions of said user amongst the at least one user for said version of the event, thereby, providing real-time dynamic visibility and permissions to said user in a complex financial environment. Notably, zero indicating the corresponding permission represented by said bit being denied implies that said user cannot view said version of the event. Similarly, one indicating the corresponding permission represented by said bit being granted implies that said user can view said version of the event. The technical effect of is that the value assigned to each bit accurately defines if the access permissions is denied or granted for said user.

Notably, storing the generated encoded value for each version of each event enables the recording of the generated encoded value for each version of each event to be accessed at a later point in time, whenever required.

The term "deviations" used herein pertains to changes or deltas in the values of the plurality of data entries for the corresponding plurality of events over a period of time. The deviations in each data entry are received from the plurality of input streams, and are recorded to be stored in the dataset. Throughout the present disclosure, the term "at least one action" refers to one or more activities that are performed with the plurality of events that causes the values of the plurality of data entries of the corresponding plurality of events to deviate over the period of time. Throughout the present disclosure, the term "dataset" refers to a data collection of the recorded deviations in each data entry. Notably, creating the dataset enables retrieval of the deviations in the plurality of data entries for the corresponding plurality of events as and when required.

Optionally, the deviations in each data entry are recorded at fixed instants of time and the dataset is an aggregated dataset created at the fixed instants of time for a predetermined number of the fixed instants of time. In this regard, the deviations in each data entry being recorded at the fixed instants of time removes the need for continuously recording those deviations in each entry that do not influence the corresponding event. Subsequently, the deviations in each data entry between two consecutive fixed time instants that do not influence the corresponding event are discarded. Throughout the present disclosure, the term "fixed instants of time" refers to particular moments of time at which the deviations in each data entry are recorded. For example, if there are no updates in a given data entry between two consecutive fixed instants of time that affects an output of the corresponding event then no deviations are recorded for the given data entry between the two consecutive fixed instants of time. It will be appreciated that the dataset being the aggregated dataset facilitates the quick access and retrieval of data from the dataset. Subsequently, the predetermined number of the fixed instances of time at which the deviations in each data entry are recorded limits the number of deviations of each data entries that are recorded. Optionally, same values for each data entry are recorded multiple times in different strips for storing the deviations in each data entry at the fixed instants of time. A resultant technical effect of the deviations in each data entry being recorded at the fixed instants of time and the dataset being the aggregated dataset created is that the processing and memory resources are effectively utilized.

Optionally, the fixed instants of time are at intervals selected from a range of 1 second to 1 hour. In this regard, the fixed instants of time are uniformly separated by a time period selected from the aforementioned range. A beneficial effect of the fixed instants of time being at intervals selected from the aforementioned range is that the deviations in each data entry are recorded uniformly.

Optionally, the deviations in each data entry are recorded for a continuous time period and the dataset is an unaggregated dataset created for the continuous time period. In this regard, the deviations in each data entry being recorded for the continuous time period ensures that even any minute deviation in any data entry within the continuous period of time is recorded. Throughout the present disclosure, the term "continuous time period" refers to a continuous duration of time during which the deviations in each data entry are recorded. A technical effect is that the deviations in each data entry are recorded with enhanced precision for the continuous time period.

Throughout the present disclosure, the term "user query" refers to a query provided by the user that enables the identification of what data the user requires to be retrieved. Notably, the user query comprises one or more parameters (i.e., at least one parameter) associated with properties of the plurality of events, such as a contract to which each event relates, a time window of each event, a time granularity of each event, and the like, that enables the identification of the at least one event associated with the user query. Optionally, the user query is filtered to be used for only the at least one event amongst the plurality of events in which the user is the counterparty, as identified by the at least one parameter in the user query.

Notably, the version amongst the plurality of versions is the specific versions of the at least one event for which the user has the access permissions. Subsequently, determining the version amongst the plurality of versions indicative of the access permissions for the user ensures that the data from only that version of the at least one event is retrieved for which the user has the access permissions. Moreover, identifying the at least one data entry amongst the plurality of data entries that corresponds to the determined version of the at least one event enables the effect determination of which of the one or more data entries amongst the plurality of data entries are included in the determined version of the at least one event that is identified from the user query.

Notably, the strips storing the at least one data entry relevant to the at least one event identified from the user query are selected to minimize the usage of resources such as the total amount of data to be read, the amount of Random Access Memory (RAM) required, and the like. Subsequently, information related to the contents of a given strip are known to enable the strips to be efficiently and quickly filtered, without the need for reading all of the strips. Moreover, the strips of data are indexed to enable effective and quick filtration of the strips. Optionally, known relational databases are used for indexing the databases, in an effective and optimal manner.

Afterwards, the method comprises the step of retrieving the recorded deviation in the at least one data entry at the intervals of the time duration indicated in the user query, based on the stored dataset of the recorded deviations for the at least one data entry. Notably, the search for the required information is performed on the dataset of the recorded deviations for the at least one data entry identified from the at least one user query. Herein, due to the deviations in the at least one data entry being recorded in different strips for the different fixed instants of time, the intervals of the time duration indicated in the user query or multiples thereof, are aligned with the different strips for the different fixed instants of time to find the strip from which the recorded deviation in the at least one data entry is to be retrieved. Subsequently, the recorded deviations in at least one data entry at the intervals of the time duration are retrieved with minimal resource usage. In this regard, as the plurality of data entries having raw financial data and the deviations are recorded and stored in form of semantics, the retrieval of the recorded deviations for the at least one data entry is simplified, thereby improving the retrieval speed. Herein, retrieving the recorded deviations for the at least one data entry at the intervals of the time duration enables the reduction of processing time and resources required, as thousands of samples in the at least one data entry are reduced to hundreds which is easier to display in the form of charts.

In an example, the at least one data entry comprises 8 recorded deviations which are: "Order A being inserted at price 10" with timestamp of 11:59:35, "Order A being updated at price 11" with timestamp of 11:59:50, "Order A being updated at price 12" with timestamp of 12:00:05, "Order A being updated at price 13" with timestamp of 12:00:20, "Order A being updated at price 14" with timestamp of 12:00:35, "Order A being updated at price 15" with timestamp of 12:00:50, "Order A being updated at price 16" with timestamp of 12:01:05, "Order A being deleted" with timestamp of 12:01:20 respectively. Herein, the time duration is 1 minute and hence the recorded deviation of the at least one data entry at timestamps 11:59:00, 12:00:00, 12:01:00, 12:02:00 are retrieved, which are: "None" with timestamp of 11:59:00, "Order A at price 11" with timestamp of 12:00:00 and last updated at timestamp 11:59:50 to "price 11", "Order A at price 15" with timestamp of 12:01:00 and last updated at timestamp 12:00:50 to "price 15", "None" with timestamp of 12:02:00 and the at least one data entry being deleted at timestamp 12:01:20, respectively.

Throughout the present disclosure, the term "response" refers to a final output comprising the retrieved data provided in response to the user query to the user. Notably, the response is determined based on the at least one data entry and the retrieved recorded deviation in the at least one data entry at the intervals of the time duration by using the recorded deviation in the at least one data entry with the value of the at least one data entry to initially determine what the final value of the at least one data entry would be when the user query for data retrieval is received. Subsequently, the final value determined of the at least one data entry is used in providing the response to the user.

TABLE 2

| Time | Action | Venue | Order ID | Price | Tradable |
|---|---|---|---|---|---|
| 14:00:00 | Insert | 1 | 1001 | 10.0 | True |
| 14:01:00 | Insert | 1 | 1002 | 20.0 | True |
| 14:02:00 | Insert | 2 | 20001 | 15.0 | True |

TABLE 3

| Time | Action | Venue | Order ID | Price | Tradable |
|---|---|---|---|---|---|
| 14:00:00 | Insert | 1 | 1001 | 10.0 | True |
| 14:02:00 | Insert | 2 | 20001 | 15.0 | True |

TABLE 4

| Time | Action | Venue | Order ID | Price | Tradable |
|---|---|---|---|---|---|
| 14:00:00 | Insert | 1 | 1001 | 10.5 | True |
| 14:01:00 | Insert | 1 | 1002 | 20.0 | False |
| 14:02:00 | Insert | 2 | 20001 | 15.0 | True |

TABLE 5

| Time | Action | Venue | Order ID | Price | Tradable | Encoded Value |
| --- | --- | --- | --- | --- | --- | --- |
| 14:00:00 | Insert | 1 | 1001 | 10.0 | True | {1, 2} |
| 14:00:00 | Insert | 1 | 1001 | 10.5 | True | {3} |
| 14:01:00 | Insert | 1 | 1002 | 20.0 | True | {1} |
| 14:01:00 | Insert | 1 | 1002 | 20.0 | False | {3} |
| 14:02:00 | Insert | 2 | 20001 | 15.0 | True | ⌐∅ (i.e. visible to all perspectives) |

In an example, TABLE 2, TABLE 3 and TABLE 4 depicts retrieved data entries that are provided as the response to user A, user B and user C, respectively, based on the access permissions of user A, user B and user C. Moreover, TABLE 5 depicts a combined single stream of retrieved data entries for user A, user B, and user C.

The present disclosure also relates to the system as described above. Various embodiments and variants disclosed above, with respect to the aforementioned method, apply mutatis mutandis to the system.

Throughout the description, the term "processor" refers to a component capable of receiving inputs, analyzing the information contained in the input, executing various steps to perform specific activities and providing an output corresponding to the input received. The processor is configured to execute various steps in the aforementioned method for data storage and retrieval. The processor is configured to be communicably connected to various elements and components within the aforementioned system, as well as external elements and components outside the system over a suitable communication medium. The processor may be configured to encompass various hardware components and software applications involved in data processing, computation, and control within the aforementioned system. The processor is further configured to: encode or decode available information in the received inputs; search and identify information stored in a data repository. The processor may be at least one of: a microprocessor, a microcontroller, a central processing unit (CPU), graphics processing units (GPUs), digital signal processors (DSPs) and any such device or component capable of performing aforementioned activities.

Optionally, the deviations in each data entry are recorded at fixed instants of time and the dataset is an aggregated dataset created at the fixed instants of time for a predetermined number of the fixed instants of time.

Optionally, the deviations in each data entry are recorded for a continuous time period and the dataset is an unaggregated dataset created for the continuous time period.

Optionally, to implement the step of receiving the plurality of data entries from the computing application, the processor is further configured to:

receive data entries from a plurality of input streams, and merge the data entries received from the plurality of input streams for generating the plurality of data entries.

Optionally, the data entries received from the plurality of input streams are synchronized and merged using one of: sorting, filtering, pattern recognition algorithms.

Optionally, the encoded value for each version of each event comprises a plurality of bits, and wherein each bit amongst the plurality of bits represents the access permissions for each user amongst the at least one user associated with said version of said event.

Optionally, a value assigned to each bit amongst the plurality of bits is:

zero indicating the access permissions represented by said bit is denied; or one indicating the access permissions represented by said bit is granted.

Optionally, the access permissions comprises a read permission to view said version of said event.

Optionally, the aggregated dataset of the recorded deviations for each data entry is stored in the form of strips.

Optionally, the fixed instants of time are at intervals selected from a range of 1 second to 1 hour.

DETAILED DESCRIPTION OF THE DRAWINGS

Figure 1A:
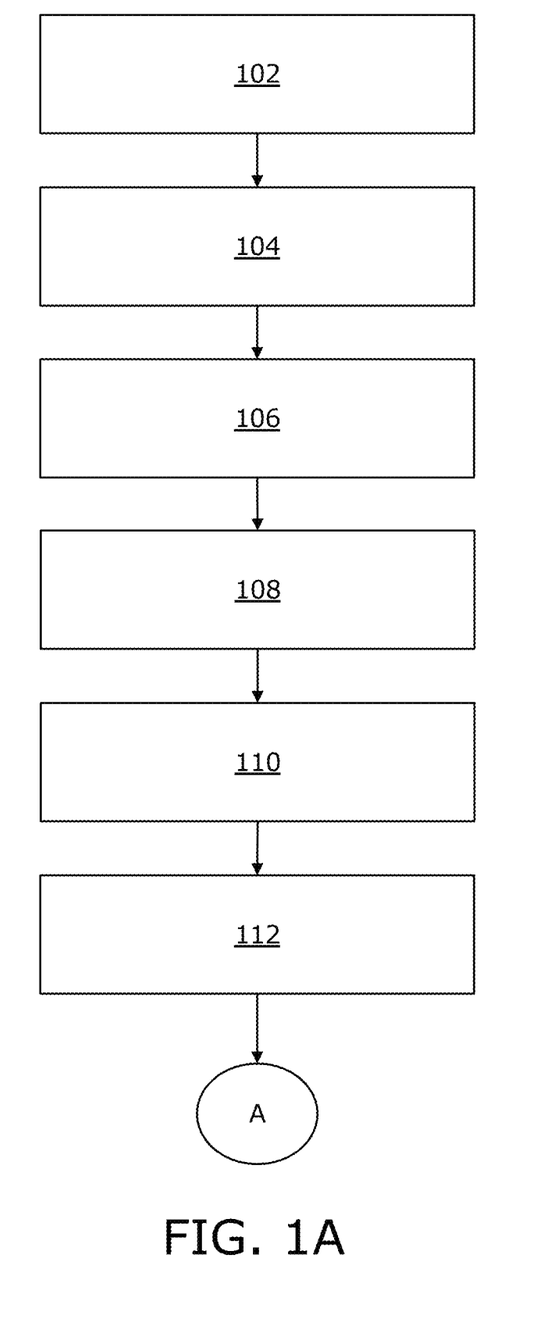
FIG. 1A is an illustration of a flow chart depicting steps of a method for data storage and retrieval, in accordance with an embodiment of the present disclosure, including: receive data entries 102; generate encoded value 104; generated encoded value for each version of each event 106; deviations 108; create dataset 110; and store dataset 112.
Figure 1B:
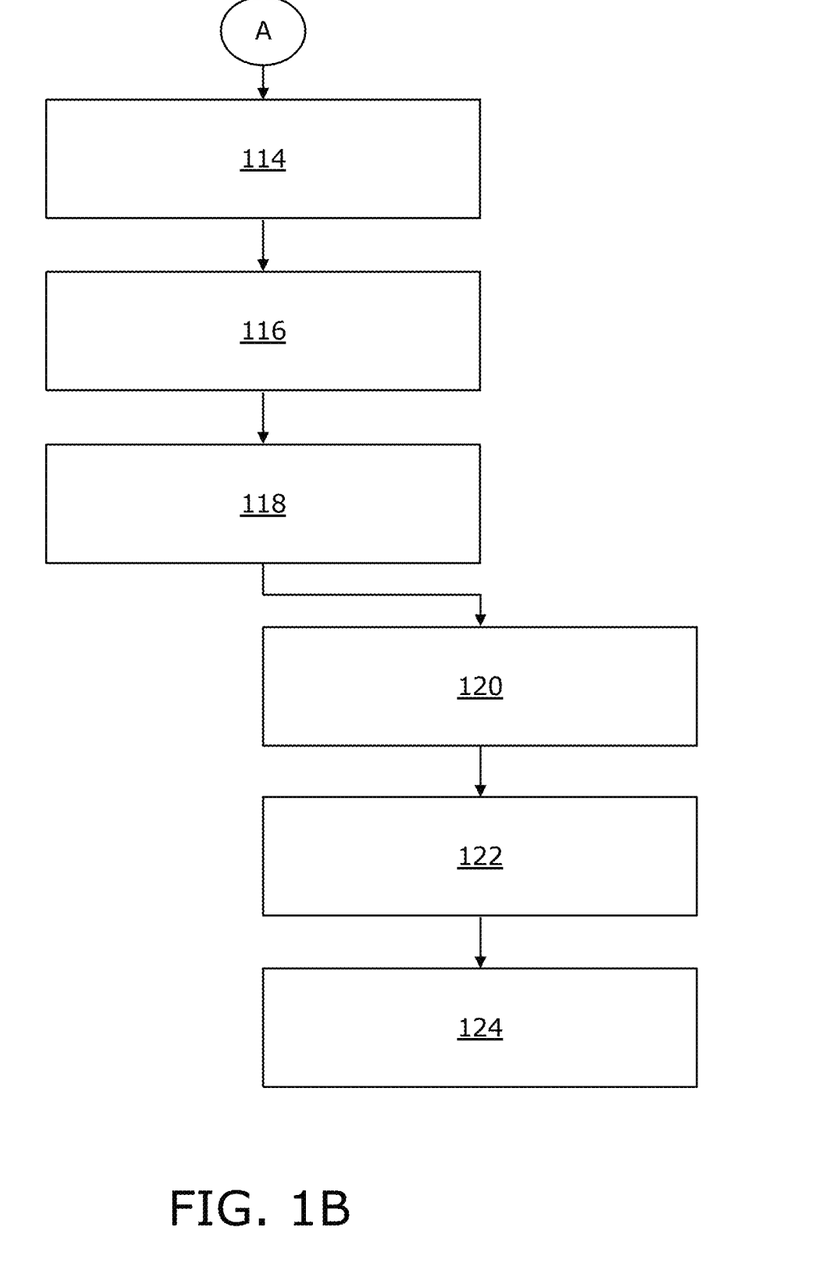
FIG. 1B is an illustration of a flow chart depicting steps of a method for data storage and retrieval, in accordance with an embodiment of the present disclosure, including: receive a user query for data retrieval 114; determine a version of the at least one event 116; identify one data entry 118; retrieve deviation 120; determine a response 122; and provide the response to user 124.

Referring to FIGS. 1A and 1B collectively, illustrated is a flow chart depicting steps of a method for data storage and retrieval in accordance with an embodiment of the present disclosure. At step 102, a plurality of data entries for a corresponding plurality of events are received from a computing application, wherein each event amongst the corresponding plurality of events comprises a plurality of versions having different values of the plurality of data entries stored therein. At step 104, an encoded value is generated for each version of each event, wherein the generated encoded value is indicative of access permissions exclusive for at least one user amongst a plurality of users for each version of each event. At step 106, the generated encoded value for each version of each event. At step 108, deviations, in each data entry, are recorded based on at least one action associated with the plurality of the events. At step 110, a dataset of the recorded deviations is created. At step 112, the dataset of the recorded deviations for each data entry is stored. At step 114, a user query for data retrieval is received from a user amongst the plurality of users, wherein the user query comprises at least one parameter identifying at least one event amongst the plurality of events associated with the user query. At step 116, a version amongst the plurality of versions of the at least one event indicative of access permissions for the user is determined, based on the stored encoded value for the plurality of versions of the at least one event. At step 118, at least one data entry amongst the plurality of data entries is identified corresponds to the determined version of the at least one event identified from the user query. At step 120, the recorded deviation in the at least one data entry at intervals of a time duration, indicated in the at least one parameter in the user query, is retrieved based on the stored dataset of the recorded deviations for the at least one data entry. At step 122, a response is provided to the user, wherein the response is determined based on the at least one data entry and the retrieved recorded deviation in the at least one data entry at the intervals of the time duration.

The aforementioned steps are only illustrative and other alternatives can also be provided where one or more steps are added, one or more steps are removed, or one or more steps are provided in a different sequence without departing from the scope of the claims herein.

Figure 2:
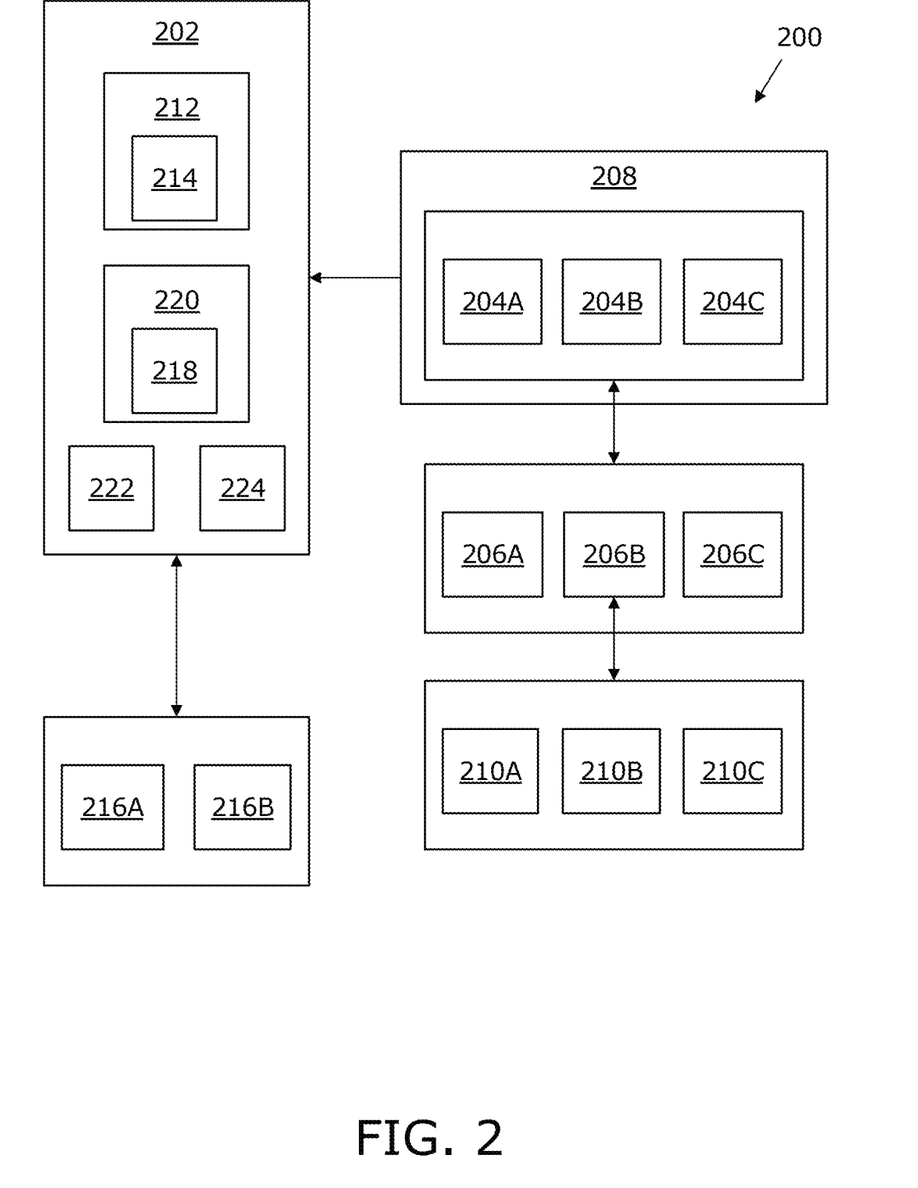
FIG. 2 is an illustration of a block diagram of a system 200 for data storage and retrieval, in accordance with an embodiment of the present disclosure, including a processor 202; and a computing application 208.

Referring to FIG. 2, illustrated is a block diagram of a system 200 for data storage and retrieval in accordance with an embodiment of the present disclosure. As shown, the system 200 comprises a processor 202. The processor 202 is configured to receive a plurality of data entries (depicted as a first data entry 204A, a second data entry 204B, and a third data entry 204C) for a corresponding plurality of events (depicted as a first event 206A, a second event 206B, and a third event 206C) from a computing application 208, wherein each event amongst the corresponding plurality of events 206A-C comprises a plurality of versions (depicted as a first version 210A, a second version 210B, and a third version 210C) having different values of the plurality of data entries 204A-C stored therein. Moreover, the processor 202 is configured to generate an encoded value 212 for each version of each event, wherein the generated encoded value is indicative of access permissions 214 exclusive for at least one user (for example a first user 216A) amongst a plurality of users (depicted as the first user 216A and a second user 216B) for each version of each event. Furthermore, the processor 202 is configured to store the generated encoded value 212 for each version of each event. Furthermore, the processor 202 is configured to record deviations 218 in each data entry based on at least one action associated with the plurality of the events 206A-C. Furthermore, the processor 202 is configured to create a dataset 220 of the recorded deviations 218. Furthermore, the processor 202 is configured to store the dataset 220 of the recorded deviations 218 for each data entry. The processor 202 is configured to receive a user query 222 for data retrieval from a user (for example the second user 216B) amongst the plurality of users 216A-B, wherein the user query 222 comprises at least one parameter indicating at least one event (for example the second event 206B) amongst the plurality of events 206A-C associated with the user query 222. The processor 202 is configured to determine a version (for example the second version 210B) amongst the plurality of versions 210A-C of the at least one event 206B indicative of access permissions for the user 216B, based on the stored encoded value 214 for the plurality of versions 210A-C of the at least one event 206B. The processor 202 is also configured to identify at least one data entry (for example the second data entry 204B) amongst the plurality of data entries 204A-C that is corresponding to the determined version 210B of the at least one event 206B identified from the user query 222. The processor 202 is configured to retrieve the recorded deviation 218 in the at least one data entry 204B at intervals of a time duration indicated in the at least one parameter in the user query 222, based on the stored dataset 220 of the recorded deviations 218 for the at least one data entry 204B. The processor 202 is configured to provide a response 224 to the user 216B, wherein the response 224 is determined based on the at least one data entry 204B and the retrieved recorded deviation 218 in the at least one data entry 204B at the intervals of the time duration.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for data storage and retrieval, the method comprising:
   receiving a plurality of data entries for a corresponding plurality of events from a computing application, wherein each event amongst the corresponding plurality of events comprises a plurality of versions having different values of the plurality of data entries stored therein;
   generating an encoded value for each version of each event, wherein the generated encoded value is indicative of access permissions exclusive for at least one user amongst a plurality of users for each version of each event;
   storing the generated encoded value for each version of each event;
   recording deviations, in each data entry, based on at least one action associated with the plurality of the events;
   creating a dataset of the recorded deviations;
   storing the dataset of the recorded deviations for each data entry;
   receiving a user query for data retrieval from a user amongst the plurality of users, wherein the user query comprises at least one parameter identifying at least one event amongst the plurality of events associated with the user query;
   determining a version amongst the plurality of versions of the at least one event indicative of access permissions for the user, based on the stored encoded value for the plurality of versions of the at least one event;
   identifying at least one data entry amongst the plurality of data entries that is corresponding to the determined version of the at least one event identified from the user query;
   retrieving the recorded deviation in the at least one data entry at intervals of a time duration indicated in the at least one parameter in the user query, based on the stored dataset of the recorded deviations for the at least one data entry; and
   providing a response to the user, wherein the response is determined based on the at least one data entry and the retrieved recorded deviation in the at least one data entry at the intervals of the time duration.

2. The method of claim 1, wherein the deviations in each data entry are recorded at fixed instants of time and the dataset is an aggregated dataset created at the fixed instants of time for a predetermined number of the fixed instants of time.

3. The method of claim 2, wherein the fixed instants of time are at intervals selected from a range of 1 second to 1 hour.

4. The method of claim 1, wherein the deviations in each data entry are recorded for a continuous time period and the dataset is an unaggregated dataset created for the continuous time period.

5. The method of claim 1, wherein the step of receiving the plurality of data entries from the computing application further comprises:
   receiving data entries from a plurality of input streams, and
   merging the data entries received from the plurality of input streams for generating the plurality of data entries.

6. The method of claim 5, wherein the data entries received from the plurality of input streams are synchronized and merged using one of: sorting, filtering, pattern recognition algorithms.

7. The method of claim 1, wherein the encoded value for each version of each event comprises a plurality of bits, and wherein each bit amongst the plurality of bits represents the access permissions for each user amongst the at least one user associated with said version of said event.

8. The method of claim 7, wherein a value assigned to each bit amongst the plurality of bits is:
   zero indicating the access permissions represented by said bit is denied; or
   one indicating the access permissions represented by said bit is granted.

9. The method of claim 1, wherein the access permissions comprises a read permission to view said version of said event.

10. The method of claim 1, wherein the plurality of data entries are stored in the form of strips.

\* \* \* \* \*